United States Patent [19]

Snajdr

[11] 3,719,825
[45] March 6, 1973

[54] METHOD OF MONITORING A NEUTRON FLUX WITH A CERAMIC NEUTRON FLUX MONITOR

[75] Inventor: Edward A. Snajdr, Urbana, Ill.

[73] Assignee: The United States of America as represented by the United States Atomic Energy Commission

[22] Filed: May 24, 1971

[21] Appl. No.: 146,431

Related U.S. Application Data

[63] Continuation of Ser. No. 816,407, April 15, 1969.

[52] U.S. Cl. ..........250/83.1, 250/83.3 R, 250/106 T
[51] Int. Cl. ................................................G01t 3/00
[58] Field of Search.............250/83.1, 83.3 R, 106 T; 176/10, 17 R; 106/58

[56] References Cited

UNITED STATES PATENTS

| 3,263,081 | 7/1966 | Wiesemann et al. | 250/83.3 R |
| 2,260,034 | 10/1941 | Krautz et al. | 106/46 |
| 3,142,625 | 7/1964 | Wellborn | 176/19 R |

OTHER PUBLICATIONS

Meidensha, 51, 20–4, October 1963 (N.S.A. Vol. 19, No. 10 – Abstract No. 18,439); Sci. Library.

*Primary Examiner*—Archie R. Borchelt
*Attorney*—Roland A. Anderson

[57] ABSTRACT

A method of monitoring the neutron flux of a nuclear reactor at high temperatures employing monitors which are pressed and sintered ceramic pellets containing about 99 percent finely ground, high-purity magnesium oxide as matrix material and about 1 percent finely ground, high-purity nickel monooxide or cobaltous oxide uniformly distributed in the matrix material as activation compound.

2 Claims, No Drawings

METHOD OF MONITORING A NEUTRON FLUX WITH A CERAMIC NEUTRON FLUX MONITOR

This is a continuing application from application Ser. No. 816,407, filed Apr. 15, 1969.

CONTRACTUAL ORIGIN OF THE INVENTION

The invention described herein was made in the course of, or under, a contract with the U.S. Atomic Energy Commission.

BACKGROUND OF THE INVENTION

This invention relates to a method of monitoring the neutron flux of a nuclear reactor at high temperature employing ceramic neutron monitors. In more detail, the invention relates to so employing a ceramic neutron flux monitor containing a precisely determined proportion of an activation compound uniformly distributed therein.

Radiation detectors consisting of a thin foil or wire of a suitable metal such as indium or rhodium have long been used to monitor the neutron flux at specific locations within a nuclear reactor. While such foils are perfectly satisfactory for use in reactors operating at relatively low temperatures, they are not available for use in most existing or planned fast reactors wherein the temperature of operation is relatively high. In such reactors, ceramic flux monitors — formed of a material which is compatible with the environment at the temperature obtaining — must be employed.

Pellets formed of an alumina matrix doped with a small quantity of an activation compound such as cobaltous oxide or nickel oxide have been used in the past for this purpose but are not completely satisfactory. It has been found that such ceramic monitors must be individually calibrated prior to use due to the wide variance in the proportion of doping compound present in them. This is attributed to the fact that alumina and cobaltous oxide or nickel oxide form intermediate binary compounds between end members of the binary system. Second-phase precipitation of these binary compounds in the alumina base system will decrease the high-temperature stability of the system. Heating of the alumina system causes second-phase precipitation and doping compound segregation.

Ceramic flux monitors consisting of an alumina matrix doped with a rear earth oxide were described by Kuhari and Fujimoto in Meidensha Jiho, 51, 20–4, October 1963 (NSA Vol. 19, No. 10 - Abstract No. 18,439). That the described monitors would not be completely satisfactory for use at high temperatures under a high exposure to radiation may be concluded from the investigations of Tresvyatskii and Chevepanov, and Grossman.

An investigation of phase diagrams of $Al_2O_3$ and $Gd_2O_3$ and of $Al_2O_3$ and $Sm_2O_3$ is reported in Zhurnal Vsesayuvnogo Khimicheskogo Obsshchestva, No. 6, 612–618 (1961) by Tresvyatskii and Chevepanov. The work was translated in FTD-TT-62-505 (NSA 16 (27,642)). The reported results indicate to the investigators that these systems do not form a complete solid solution series and that intermediate compound formation occurs. Second-phase precipitation would therefore be expected.

Leonard M. Grossman in CONF-660505-8 (NSA 20 (39,437)) states that the system $Gd_2O_3 - Al_2O_3$ is simple eutectic which implies no intermediate binary compound formation and each of the compounds should remain as a discrete phase. Regardless of whether the interpretation reported in NSA 16 (27,642) or in NSA 20 (39,437) is correct as to intermediate compound formation, both indicate the lack of mutual solid solubility.

Thus, in view of the lack of mutual solid solubility in the systems described in NSA 19 (18,439) and the possible formation of intermediate compounds therein, it can be predicted that these monitors would not be completely satisfactory at high temperatures and high exposures to radiation. Budnikov, Kushakovskii and Belevantsev in Dokl. Akad. Nauk SSSR, 165, 1075–7 Dec. 11, 1965) (NSA 20, 25,053) do report that a single-phase structure arises in compositions of $Gd_2O_3 - Al_2O_3$ and $Sm_2O_3 - Al_2O_3$ containing about 66 mol. percent of the rare earth. This concentration of rare earth, of course, is far above the range of interest for this application. No data covering the solidus-liquidus region in the system $Al_2O_3 - Lu_2O_3$ has been found.

One of the major projects of the United States Government in the atomic energy field at present is the development of the fast breeder reactor to the point of commercial practicability. To this end, a "Fast Flux Test Facility" is now being designed. Ceramic flux monitors are required for the fast reactor contained in this facility to determine flux contours, relate flux and power, detect localized flux perturbations, and estimate neutron fluence (time integrated flux). These monitors will provide surveillance information on reactor components such as the pressure vessel, help to calibrate out-of-core neutron instrumentation and determine the fluence in a loop experiment. Such monitors should, of course, be as near as is physically possible to being identical in size, shape and physical composition to ensure accurate and uniform results.

SUMMARY OF THE INVENTION

The neutron flux of a nuclear reactor is measured at high temperatures by disposing ceramic monitors containing an activation compound at specific locations in the reactor and measuring the radioactivity induced in these monitors. The ceramic monitors employed are prepared by carefully mixing about 1 weight percent finely ground cobaltous oxide or nickel oxide with finely ground magnesium oxide, adding a binder, pressing into pellet form and sintering — preferably after a preheating step.

DESCRIPTION OF THE PREFERRED EMBODIMENT

The general procedure employed in preparing the ceramic monitors to be used in the method is to mix very pure finely divided magnesium oxide powder with the desired proportion of a doping compound which will be activated by neutrons. The mixture is ball milled in alcohol for an extended period of time and then dried. A binder is added and the mixture is pressed into pellets. The pellets are preferably prefired at an intermediate temperature for several hours and then fired for several hours.

The doping compounds specifically found useful according to this invention were CoO and NiO. The preferred proportion of matrix material to doping compound is 99 to 1, although it is apparent that minor variations from this are permissible. The powders employed must be finely divided and extremely pure, since it is only with such materials that reproducible results can be attained. Ball milling is necessary for the same reason. Preliminary tests showed that sound pellets could not be obtained without using a binder. While presintering is desirable, it is not essential, since a heating schedule not involving holding the pellets for a considerable length of time at a temperature below the sintering temperature could undoubtedly be developed. Examples demonstrating the procedure for making the monitors employed in the method follow.

EXAMPLE I

A mixture of 49.5 grams MgO and 0.5 gram NiO was prepared and ball milled in propanol for 19 hours. The slurry was filtered through a glass funnel frit with a vacuum line attached to speed up filtering action and dried in a vacuum oven for 30 minutes at 75° C. The dried powder was removed from the oven and forced through a 65-mesh screen. The powder was mixed with 22 cc of a carbowax and water solution (50 grams carbowax to 250 cc water) which is approximately 10 weight percent carbowax. The powder was then dried for two hours at 100° C. in a vacuum oven and forced through a 65-mesh screen. Approximately 40 pellets were pressed at approximately 50,000 psi. A representative group of pellets were all 0.185 inch in diameter and between 0.149 and 0.154 inch in length and weighed 0.150 to 0.155 gram.

Presintering was carried out in a Dyna-pak furnace. The pellets were placed in a cold furnace at the lowest temperature setting, 250° C. The pellets rested on about one-eighth inch of magnesia powder in the bottom of a magnesia crucible. It was intended to employ a temperature rise cycle of 25° C. per 15 minutes until 800° C. was reached. However, the furnace inadvertently went to 600° C. immediately. The furnace was turned back to 300° C. and the rise cycle started over. When the furnace temperature reached 800° C., the set point was moved to 1,100° C. and this temperature was maintained for 4 hours. The furnace was then turned off and the pellets left in the furnace to cool to room temperature. The pellets were light gray in color with some spots being noticed, probably caused from particles from the furnace bricks falling on the pellets.

The pellets were then sintered in a Lindberg furnace. The pellets were placed in the furnace at 350° C. and the temperature increased at 25° C. per 15 minutes until 800° C. was reached. This temperature was maintained for 4 hours. The set point was raised to 1,500° C. and the power setting on the furnace raised from the No. 1 position to the No. 4 position when the temperature reached 900° C. The temperature was held at 1,500° C. for four hours. The set point was returned to 350° C. and the furnace allowed to stabilize at this temperature before the pellets were removed. There was some cracking noted in the pellets. The pellets were light green in color. After sintering, the representative group of pellets was 0.157 to 0.158 inch in diameter, 0.130 to 0.135 inch in length and weighed 0.137 to 0.138 gram.

EXAMPLE II

A mixture of 49.5 grams MgO and 0.5 gram CoO was prepared and ball milled for 13 to 14 hours in alcohol with all other procedures and conditions of pellet preparation being the same as those used in Example I. A representative group of pellets in the as-pressed condition was 0.185 inch in diameter, 0.149 to 0.154 inch in length and weighed 0.150 to 0.155 gram.

As-pressed pellets were placed in the vacuum drying oven and the temperature raised to 225° C. in 1 hour, 15 minutes. The pellets were removed and immediately placed in the Lindberg sintering furnace at 350° C. The temperature was increased at the rate of 25° C. per 15 minutes until a temperature of 800° C. was reached. The set point was then raised to 1100° C. and this temperature maintained for 4 hours. The set point was then moved to 1,500° C. and this temperature was maintained for 4 hours. The set point was returned to 350° C. and the temperature allowed to stabilize. The pellets were then removed and cooled to room temperature. The pellets were pink in color and appeared to be crack free. After sintering, the group of pellets mentioned above was 0.157 to 0.158 inch in diameter, 0.130 to 0.135 inch in length and weighed 0.137 to 0.138 gram.

The following example is illustrative of the uniformity of the pellets employed in the method which will directly determine the accuracy and reproducibility of the results obtainable in monitoring a neutron flux.

EXAMPLE III

Fifteen pellets produced by the process of Example I and 15 by the process of Example II were taken at random and irradiated to determine the variation between pellets. Comparison of the cobalt monitors at the 95 percent confidence level shows that pellets having an $Al_2O_3$ matrix vary in monitor metal content by ±12 percent, whereas the MgO matrix pellets vary only ±0.7 percent. Similar results were attained with the pellets containing NiO.

Pellets made in accordance with this invention were compared with those made in accordance with prior art procedures. The prior art pellets consisted of $Al_2O_3$ oxide pellets approximately ⅛ inch in diameter × ⅛ inch in length which are doped with NiO, CoO, or FeO. The technique used for preparation consists of dry pan mixing $Al_2O_3$ with ≈400 ppm addition of the doping compound. Since the amount of doping agent in each pellet varies by 5 percent, each pellet must be calibrated by preirradiation with a known flux and analyzed before doping. These monitors usually looked to be improperly mixed after doping.

Photomicrographs show clearly that the doping compound is distributed unevenly in discrete inclusions in the prior art monitors, which inclusions increase in size on heating for an extended period of time. The doping compound is seen to be distributed much more evenly in pellets constructed in accordance with the present invention, with little change on heating. Microprobe analyses for the doping compound show the same thing.

The reason for the improved results is believed to be due to the fact that MgO and the doping compounds NiO and CoO form a complete solid solution series between the binary system end members with no second-phase precipitation at temperatures below the solidus region. Compare the behavior of $Al_2O_3 - CoO$ and $Al_2O_3 - NiO$ mixtures described above.

While monitors containing FeO were not prepared or tested, it can be predicted based on theory that they will also be satisfactory. On the other hand, compounds that do not form a complete series of solid solutions with MgO will not be satisfactory.

It will be understood that the invention is not to be limited to the details given herein but that it may be modified within the scope of the appended claims.

The embodiments of the invention in which an exclusive property or privilege is claimed are defined as follows:

1. A method of monitoring the neutron flux of a nuclear reactor at high temperatures comprising; disposing a plurality of ceramic neutron flux monitors in said reactor at specific locations; said monitors consisting of a pressed and sintered pellet containing about 99 percent finely ground very high-purity magnesium oxide as matrix material and about 1 percent finely ground very high-purity nickel monooxide or cobaltous oxide as activation compound, said activation compound being uniformly distributed throughout the matrix material; and measuring the radioactivity induced therein.

2. The method of claim 1 wherein all of the ceramic neutron flux monitor pellets are of an equal weight and of equal dimensions and contain an equal quantity of activation compound.

* * * * *